(12) United States Patent
Pezzini et al.

(10) Patent No.: US 12,458,908 B2
(45) Date of Patent: Nov. 4, 2025

(54) END-TO-END CONTINUOUS PURIFICATION SYSTEM

(71) Applicant: PAK Biosolutions Inc., Vienna, VA (US)

(72) Inventors: Joanna Pezzini, Burke, VA (US); Kevin Hill-Byrne, Rockville, MD (US)

(73) Assignee: PAK BioSolutions Inc., Vienna, VA (US)

( * ) Notice: Subject to any disclaimer, the term of this patent is extended or adjusted under 35 U.S.C. 154(b) by 771 days.

(21) Appl. No.: 17/106,679

(22) Filed: Nov. 30, 2020

(65) Prior Publication Data

US 2022/0168668 A1 Jun. 2, 2022

(51) Int. Cl.

| | |
|---|---|
| B01D 17/02 | (2006.01) |
| B01J 20/281 | (2006.01) |
| B01J 39/00 | (2006.01) |
| B01J 41/00 | (2006.01) |
| C07K 1/16 | (2006.01) |
| C07K 1/34 | (2006.01) |
| C07K 1/36 | (2006.01) |

(52) U.S. Cl.
CPC ............ B01D 17/0202 (2013.01); C07K 1/16 (2013.01); C07K 1/34 (2013.01); C07K 1/36 (2013.01); *B01D 2221/08* (2013.01); *B01J 20/281* (2013.01); *B01J 39/00* (2013.01); *B01J 41/00* (2013.01)

(58) Field of Classification Search
None
See application file for complete search history.

(56) References Cited

U.S. PATENT DOCUMENTS

| | | | |
|---|---|---|---|
| 4,693,834 A | 9/1987 | Hossom | |
| 5,683,916 A * | 11/1997 | Goffe | B01D 69/08 435/6.12 |
| 6,348,219 B1 * | 2/2002 | Torres | A01N 59/00 424/722 |
| 6,802,967 B2 * | 10/2004 | Masuda | G01N 30/463 210/659 |
| 8,920,645 B2 | 12/2014 | Moran et al. | |
| 2002/0110495 A1 | 8/2002 | Hunt et al. | |
| 2009/0205409 A1 * | 8/2009 | Ciavarini | G05D 11/132 73/61.56 |

(Continued)

OTHER PUBLICATIONS

International search report and Office Action for PCT/US20/12387 to Pezzini, dated May 13, 2020.

(Continued)

*Primary Examiner* — Jonathan M Peo
(74) *Attorney, Agent, or Firm* — Storella & Witt, LLP

(57) ABSTRACT

An automated end-to-end continuous purification system for the manufacture of therapeutic proteins to reduce complexity of manual process operations and minimize physical space requirements, such system comprising a housing containing a control system, a tray and a collection vessel, wherein the system comprises a series of four purification stages, each such stage comprising a product pump and protein product line, a buffer pump and buffer line, a flow kit, two to four pinch valves and a waste line, and all such purification stages are connected by a single protein product line and are operated simultaneously.

18 Claims, 5 Drawing Sheets

(56) References Cited

U.S. PATENT DOCUMENTS

| | | | |
|---|---|---|---|
| 2013/0248451 A1* | 9/2013 | Hall | B01D 15/3809 |
| | | | 210/659 |
| 2015/0133636 A1* | 5/2015 | Xenopoulos | B01D 15/363 |
| | | | 435/238 |
| 2016/0238571 A1* | 8/2016 | Welz | B01D 11/04 |
| 2017/0023535 A1* | 1/2017 | Stanley | G01N 1/405 |
| 2018/0051054 A1* | 2/2018 | Vetter | B01D 61/145 |
| 2020/0247844 A1 | 8/2020 | Pezzini | |
| 2021/0060567 A1 | 3/2021 | Glezer et al. | |

OTHER PUBLICATIONS

Rucker-Pezzini J, Arnold L, Hill-Byrne K, Sharp T, Avazhanskiy M, Forespring, C. Single pass diafiltration integrated into a fully continuous mAb purification process. *Biotechnology and Bioengineering*. 2018;1-9.

Arnold, Lee, Rucker-Pezzini and Lee, Implementation of Fully Integrated Continuous Antibody Processing: Effects on Productivity and COGm, Biotechnology Journal, 2018; 1-10.

Coolbaugh, Michael J. et al, "Pilot-scale demonstration of an end-to-end integrated and continuous biomanufacturing process," Biotechnology and Bioengineering. 2021, https://doi.org/10.1002/bit.27670, 15 pages.

Erickson J, et al. "End-to-end collaboration to transform biopharmaceutical development and manufacturing," (2021). Biotechnology Bioengineering. 118, 3302-3312. https://doi.org/10.1002/bit.27688. 11 pages.

* cited by examiner

END-TO-END CONTINUOUS PURIFICATION SYSTEM

CROSS REFERENCE TO RELATED APPLICATIONS

Not applicable

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to an end-to-end continuous purification system for therapeutic proteins.

Background of the Invention

Automated systems for the purification of therapeutic drugs and other fluid substances are available on the market. These systems are typically classified as chromatography or filtration systems. Such systems have historically been designed to accommodate a single purification step (e.g., chromatography or filtration). In recent years, systems have been offered on the market to attach additional purification devices, such as a filter, in series with the existing purification step. Continuous purification processes also have been developed in the lab to connect all purification steps for a particular drug in series and operate all steps simultaneously. Such processes have been detailed in previous disclosures by the inventors, which disclosures are included herein by reference. (See, Rucker-Pezzini, Joanna, et al. "Single pass diafiltration integrated into a fully continuous mAb purification process." *Biotechnology and bioengineering* 115.8 (2018): 1949-1957; and Arnold, Lindsay, et al. "Implementation of fully integrated continuous antibody processing: effects on productivity and COGm." *Biotechnology journal* 14.2 (2019): 1800061.) These setups consist of a myriad of individual components. However, an end-to-end system, capable of performing all purification stages has not previously been packaged and marketed to the industry.

The use of therapeutic fluid serums containing antibodies, interferon or other therapeutic proteins are essential for the treatment of a myriad of infectious, autoimmune and inflammatory diseases. The disorders associated with such treatment are many and often well-known, including coronavirus, Crohn's disease, colitis, lupus, multiple sclerosis, psoriasis and others. The mechanisms by which therapeutic proteins treat the manifestations of such disorders are varied and, to ensure an effective response in specifically targeted tissue, it is essential that a given serum be properly formulated to contain the appropriate target protein(s) in the appropriate concentration(s), without any extraneous proteins or other types of contamination.

Methods for continuous manufacture of antibodies and other therapeutic proteins have been developed due to their improved efficiency, flexibility, and productivity over traditional batch processes. A continuous process simultaneously operates all purification steps in series. These methods do not hold the entirety of the batch product in a single tank, but merely hold sufficient product to ensure a homogeneous solution of the therapeutic protein or antibody at the inlet to a given purification step. A common monoclonal antibody purification process will consist of a Protein A affinity chromatography step, a low pH viral inactivation step, an anion exchange step (membrane or chromatography), a virus filtration step, a cation exchange chromatography step, and a diafiltration and concentration step(s). These steps typically provide orthogonal means of removing impurities that include DNA, viruses, host cell proteins, product impurities, etc. A traditional batch process would hold a 200 L batch in a 200 L tank between each of the described steps, in comparison to a 200 mL to 2 L vessel used in a continuous process. Reduced flow rates of the process allow for reduced piping or tubing sizes from ½" to ⅛", for the same size batch. This reduction in equipment size provides new opportunities for flow kits and automated systems that directly meet the needs of a continuous process.

Automated chromatography and filtration systems are known equipment for the purification of therapeutic serums, including those containing antibodies. These automated systems will typically include pumps and valves to direct flow to and from a filter or chromatography column, as well as instrumentation to monitor the process operation, such as pressure, pH, conductivity and UV. The number of these components required for a continuous purification process multiplies by the number steps performed simultaneously, greatly increasing system complexity. As such, organization and automation are required to provide a system that can be operated by an average manufacturing or lab technician and minimizes opportunities for human error.

Additionally, purification systems tend to require large amounts of lab or manufacturing floor space. This is due to the reliance of relatively large piping diameters and tanks, individual instrument components that must be connected and extensive automation hardware. The use of a single, automated system for up to four purification steps can substantially decrease the space needed and thus lower facility expenses.

What is needed is an end-to-end continuous purification system that can simultaneously perform up to four interchangeable purification steps in series, control the mass flow rate of the process, and manage flow from one step to the next, designed in a manner to reduce complexity of manual process operations and decrease lab or manufacturing space requirements. The invention described herein provides such advantages.

BRIEF DESCRIPTION OF THE INVENTION

In a preferred embodiment, a continuous protein purification system, such system comprising a housing containing a control system, a tray and a collection vessel, wherein the system comprises a series of four purification stages, each such stage comprising a product pump and product line, a buffer pump and buffer line, a flow kit, two to four pinch valves and a waste line, and all such purification stages are connected by a single product line and are operated simultaneously.

In another preferred embodiment, the continuous protein purification system as described herein, wherein the tray is embodied as a strip with a top side comprising four scales, each accommodating one flow kit for each purification stage, and a front side comprising four pinch valves per purification stage, such pinch valves opened and closed by the control system to direct flow either to a waste line or down the product line to the next stage or collection vessel.

In another preferred embodiment, the continuous protein purification system as described herein, wherein the housing comprises the buffer pumps, at least one buffer valve per pump, the product pumps and a plurality of electrical instrument connections for connecting the control system to each purification stage.

In another preferred embodiment, the continuous protein purification system as described herein, wherein the inside of the housing holds a control system comprising one or more of each of a central processing unit, memory and transmitters, such control system connected electrically or wirelessly to each of a user interface and a plurality of instruments.

In another preferred embodiment, the continuous protein purification system as described herein, wherein the central processing unit is a proportional-integral-derivative (PID) controller.

In another preferred embodiment, the continuous protein purification system as described herein, wherein the PID controller conducts PID control loops to achieve inline dilution based on pH, conductivity and/or a volumetric ratio at up to four of eight possible locations in the four-stage purification process, these locations including the inlet and outlet of each of four purification stages.

In another preferred embodiment, the continuous protein purification system as described herein, wherein the control system, instruments, buffer pumps and product pumps together provide active control of the process mass flow rate with PID control loops, with the target flow rate of the mass flow controller set to maintain a specified flow rate through any of four purification stages.

In another preferred embodiment, the continuous protein purification system as described herein, wherein each flow kit is connected to each of the product line, buffer line and waste line with flexible tubing and hose-barb connections.

In another preferred embodiment, the continuous protein purification system as described herein, where in each flow kit comprises one or more instruments from the group consisting of: pH sensor, conductivity sensor, mass flow meter, UV sensor, and pressure sensor, wherein the readings of each sensor are communicated electronically to the control system.

In another preferred embodiment, the continuous protein purification system as described herein, wherein the product line begins at a raw product container, proceeds to a first product pump, and thereafter proceeds continuously through all flow kits and product pumps and finally to the containment vessel.

In another preferred embodiment, the continuous protein purification system as described herein, wherein each purification stage comprises a purification method from the group consisting of: virus inactivation, flow through filtration or chromatography, dual column chromatography and inline concentration and diafiltration.

In another preferred embodiment, the continuous protein purification system as described herein, wherein any sequence of purification methods can be selected solely by inputting directions on a user interface.

DETAILED DESCRIPTION OF THE INVENTION

Definitions

Figure 1:
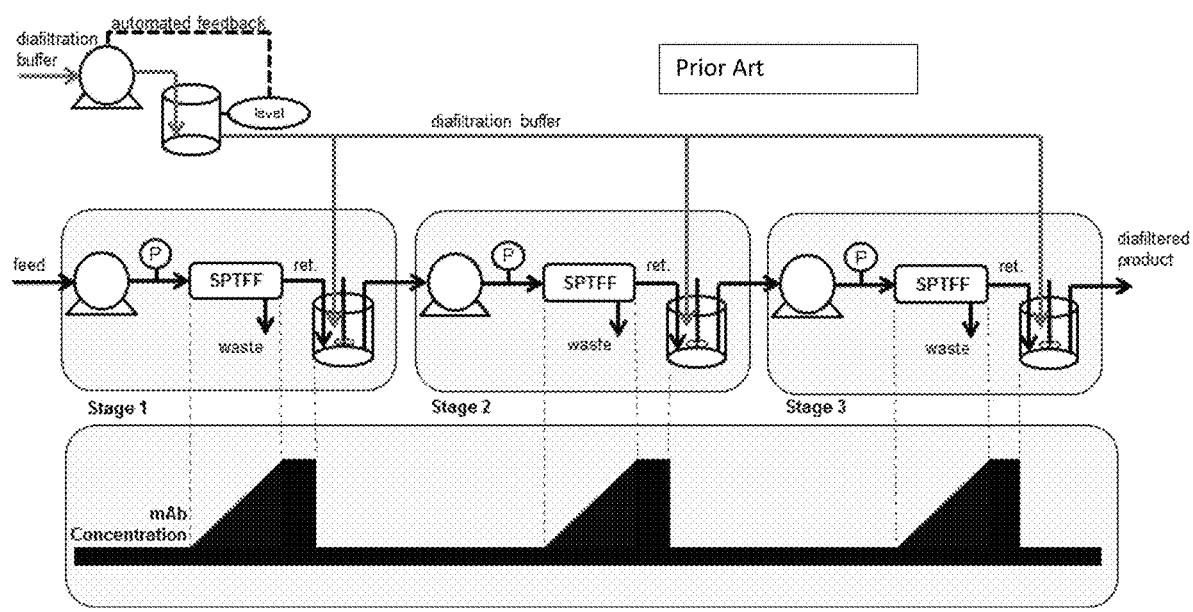
FIG. 1 is a line drawing evidencing the steps of a diafiltration process, as shown in prior art.

Liquid Chromatography is a method to separate components of a "mobile phase" mixture using a column (commonly a plastic, glass or metal tube) packed with "stationary phase" particles of various chemical or physical properties. In particular, affinity chromatography uses stationary phase particles that bind based on selective non-covalent interactions (e.g.. protein A ligands on the stationary phase bind antibodies in the mobile phase). Ion exchange chromatography separates analytes based on their respective charges (e.g. cation exchange chromatography uses negatively charged particles in the stationary phase to bind positively charged molecules in the mobile phase). The bound molecules can be removed, or eluted, in a purified form under certain chemical conditions. Size exclusion chromatography separates molecules based on size. It uses porous beads that create a long tortuous path through the column for small molecules that enter the beads, but a short path for larger molecules that do not fit through the pores. As a result, large molecules will flow out of the column first and can be separated from the smaller molecules that elute at a later time point.

Dead end filtration is a process where the flow of solution is perpendicular to a membrane surface. Solution components with a size greater than that of the membrane pores are captured on the membrane surface and solution components smaller than the pore size, including water or other solvent, are pushed through the membrane into the permeate by a pressure gradient. In an ideal scenario, no solution is retained upstream of the membrane.

Diafiltration is a process that removes or replaces unwanted salts from a solution using ultrafiltration membranes. Small, permeable molecules like salts and small proteins pass through the ultrafiltration membrane due to their molecular size, while the larger protein of interest is retained. The concentrated retentate containing the therapeutic protein is then diluted with water or other desired solution. This ultrafiltration and dilution process is performed in a recirculated loop, with tangential flow filtration, or repeated sequentially, with single-pass tangential flow filtration or dead end filtration, until the desired removal of residual salts is achieved.

Permeate is the part of a feed that passes through an ultrafiltration membrane.

PID (proportional integral derivative) controllers are a type of Programmable Logic Controller (PLC) that uses a feedback mechanism to control process variables and are frequently used in industrial settings. PID control uses closed-loop control feedback to keep the actual output from a process as close to the target or setpoint output as possible by regulating flow, pressure, temperature and other variables.

Retenate is the part of a feed that is retained and does not pass through an ultrafiltration membrane.

Tangential flow filtration is a process where the flow of solution is tangential to a membrane surface. Solution components greater than the membrane pore size are retained in solution by a sweeping action of flow on the membrane, with the exception of a thin layer commonly called a cake. Membrane components smaller than the membrane pore size pass through the membrane into the permeate by a pressure gradient.

The invention is an automated system for end to end continuous purification of therapeutic proteins, including monoclonal antibodies. In a continuous purification process all purification steps are simultaneously performed in series. The system consists of four identical stages, that include pumps, valves, instrumentation (pH, conductivity, pressure, UV), and a flow kit, to enable flow of solution to and from filters and chromatography columns currently available in the marketplace. All wetted components are attached to the outside of or are located adjacent to a system housing.

All electrical and automation hardware are located inside the system housing. A control unit embodied as an automation system, comprising a programmable logic controller (PLC), transmitters, wiring and memory with appropriate software, which control unit controls the purification system pumps and valves in a manner specific to the type of purification step that is to be performed at a given stage. The stages of the system can perform the functions of virus inactivation, flow-through filtration, chromatography, and inline concentration/diafiltration steps.

The control unit is programmed before beginning a specific system run by a user via a user interface, embodied as a touch screen or combination of screen and keyboard. Typically, the system software will prompt the user to answer a series or questions and/or fill in a series of boxes indicating information such as, without limitation:
  the stage or unit operation configuration,
  whether or not to activate features such as inlet and outlet buffer adjustment,
  storage times,
  which inlet and outlet instrumentation to activate,
  minimum, maximum and target property (e.g. pH or pressure) readings for each stage,
  minimum, maximum and target residence times,
  flow rates or velocities,
  flush volumes,
  column diameter and heights,
  sanitization holding times,
  buffer assignments, and
  start and stop collection percentages.

Once the control unit is programmed, and buffers and products loaded, the purification system may be initiated and should automatically run through completion.

A single system stage is required for each of: virus inactivation, flow through filtration, and single pass concentration. Two stages are required for a dual column chromatography operation. Multiple single pass concentration steps can be performed in series, with dilution at the inlet or outlet of each stage, to achieve diafiltration. These steps can be performed in any order and are connected in series. It is also possible to connect more than one of the disclosed systems in order to perform as many unit operations as needed for a given purification process.

The unique layout of the disclosed system organizes individual components, simplifies setup and provides an intuitive understanding of process flow. A system housing is embodied as a six-sided block, with a top and bottom, smaller end sides and two longer front and back sides. The ends consist of an inlet side and an outlet side. The system is organized as follows:

On the inlet side of the system housing (left side), four buffer valve blocks are arranged, each block adjacent to an associated buffer pump. Buffer pumps operate to effect pH adjustments, conductivity adjustments and column phases. Each valve block has one or more buffer inlets, with a preferred number of five buffer inlets per block. In a preferred embodiment, the blocks and pumps are arranged vertically up the surface of the housing inlet side. Buffer inlets allow for sanitization, equilibration, storage, chromatography and inline adjustments.

On the front side of the system housing are four product pumps, one for each purification stage, as well as electrical connections for various instruments.

A tray is positioned adjacent to the system. The tray holds a plurality of scales, preferably four, wherein a flow kit is mounted on each scale. Preferably, the disclosed system utilizes solid, single use flow kits as described in U.S. patent application Ser. No. 16/263,855 to Pezzini et al., wherein the flow from a buffer block and product pump are each introduced and processed, then proceed along to the next filter/column or collection vessel. This flow kit design mitigates the risk of leaks with sanitary clamp and hose barb connections, providing a sterile assembly, a 4 bar (58 psi) pressure rating, and instrument connections for each of pH, conductivity and UV, and static mixers.

Fluid flow is accomplished via flexible hoses connected to the various pumps, flow kits and components with hose barbs. Such hoses may be pinched closed by the pinch valves, a plurality of which are located on the tray. In a preferred embodiment, four pinch valves per flow kit are provided, such that one scale, one flow kit and the associated pinch valves together serve each purification stage. The preferably four pinch valves for a unit operation direct flow (1) from flow kit to waste, (2) from flow kit to filter/column inlet, (3) from filter column to flow kit or collection vessel, and (4) from filter/column to waste. Should a different number of direct flows be required, then more or fewer pinch valves might be required.

Monitoring sensors or instruments are provided at the flow kits, such instruments including, without limitation, pH sensors, conductivity sensors, UV sensors, mass flow meters, pressure sensors and load cells. Non-limiting but preferred variations are pH and conductivity sensors with ¾" sanitary clamp probe holder, slotted UV meter with 5 mm pathlength, and single-use pressure sensors.

The automation design provides significant operational flexibility. Any process step (virus inactivation, flow-through filtration, chromatography, diafiltration and concentration) can be performed in any order. Up to four process steps can be linked together in a single system, and multiple systems can be linked together to perform as many steps as needed. The user can specify the process using control screens without the need to access code.

Virus Inactivation

Continuous virus inactivation is achieved with inline pH adjustment or inline addition of detergent based on a volumetric ratio. Continuous flow through a residence chamber such as a chromatography column, jib or other residence chamber device provides the specified hold time to achieve the required virus log reduction values (LRV).

The disclosed system performs the inline pH adjustment and monitors time in the residence chamber. If a batch of material is held within the residence chamber beyond a preset time, the system will dump all such material to waste until the residence time of exiting material is within specification. The flow is continuously moving, with the automated valves switching to direct the flow to the waste line or collection vessel as programmed. The system also allows for inline pH, conductivity, or volumetric ratio buffer addition at the outlet of the virus inactivation step to meet target ranges for the subsequent stage.

Flow Through

Flow through steps include a 0.2 µm filter, depth filter, or virus filter, and other optional filter types that operate in a dead-end mode. For these steps, the system monitors the totalized process throughput, notifies the user when the maximum filter capacity will be reached, and pauses the process if capacity is reached. Filters are often specified for once or twice daily replacement to not exceed capacities, i.e. amount of filtered material. The PAK system allows for inline buffer adjustments at the inlet and outlet of the flow through step based on pH, conductivity or volumetric ratios. Back pressure control is also performed with variable position pinch valves.

Dual Column Chromatography

A dual column chromatography step enables bind and elute chromatography methods to be performed in a semi-continuous manner. Two of the four stages of the system can be dedicated to a dual column chromatography step. The first product pump of the two stages continuously feeds product intermediate from the upstream step onto one of the two columns where it binds to the resin in the packed column. A sequence of buffers is flushed through the other column to remove impurities and/or elute product intermediate. After the buffer sequence and product load step are completed, the first and second valves of each chromatography stage switch positions so that the column that was previously in the product load state is now flushed with a sequence of buffers and the column that was previously flushed with buffers now receives product. The columns continue to switch roles in this manner for the duration of the process.

The sequence of the added buffers can be adjusted depending on the material being processed, and are taken from the group comprising equilibration, wash, elution, strip, and sanitization buffers. Each such buffer will flow through the column and then to waste, except elution buffer, which removes the product. This elution buffer, and the product intermediate eluted off the column, will be collected in an auxiliary vessel associated with the system since the volume to be collected is larger than the flow kit vessel volume. The product in the auxiliary vessel is then fed either to the subsequent stage or directly to the final stage in the process. The auxiliary vessel holds approximately five elution volumes and is mixed to ensure there is no spike in pH, conductivity, or concentration of the product fed to the subsequent stage.

Inline Concentration and Diafiltration

Single pass tangential flow filtration (SPTFF) steps concentrate the product, which flows tangentially to the ultrafiltration membrane surface and is retained, while buffer solution passes through to drain. A series of concentration and dilution steps, typically three or more, can be performed in series to perform a diafiltration or buffer exchange. According to the disclosed design, a single system can perform three concentration and dilution steps in series, followed by a final concentration step, to achieve the concentration and diafiltration targets of a traditional batch ultrafiltration/diafiltration (UFDF) process with 99.75% buffer exchange.

The disclosed system provides several control schemes for a tangential flow filtration step. The target concentration factor is set by the user and achieved with a PID control loop that adjusts filter back pressure with a variable pinch valve. The process is carefully specified to reach the concentration factor based on process flow rates, membrane area and feed concentrations. Inline dilution for a diafiltration process returns the product to its original feed concentration prior to the next stage, with buffer flow rates controlled to maintain a vessel level set point.

Concentration can be monitored with either of two methods. A concentration factor can be calculated based on flow rate ratios. Additionally, an inline single use mass flow meter can provide a density measurement, in certain flow rate ranges, that correlates with product concentration.

Several control schemes are employed to enable all steps to be performed in series with minimal break vessel volumes between stages. The last stage in the series is actively controlled under a PID loop to a calculated flow rate setpoint. For all other steps, flow is controlled to maintain break vessel levels at a target set point. The break vessels are located immediately prior to the product pump inlet of each stage. These control loops ensure that all steps run at the same mass flow rate (set by the last stage) and the break vessels do not over-flow or drain. In addition, flow rates through the various unit operations are monitored to ensure they are within the flow rate ranges specified by the user. The flow rate of the last product pump in series adjusts based on the monitored flow rates through the different unit operations.

Additional automation control includes PID control for inline buffer dilution to meet a pH, conductivity or volumetric ratio setpoint. PID control of variable pinch valves on the column/filter outlet allow for a specified inlet pressure to be achieved for virus filtration and tangential flow filtration (TFF) steps.

The automation controls valve positions and pump flow rates for buffer priming, sanitization, equilibration, pump calibration and steady state operations.

The control software associated with the purification system includes a series of setup screens that must be completed prior to operation of the system. The setup screens require the user to enter all necessary information to run a series of continuous purification steps on the PAK system. The user will enter, as ordered:
1. Order of process steps to be performed (virus inactivation, flow through, tangential flow filtration, dual column chromatography).
2. Process step specific criteria, including flow rate specifications, pressure specifications, filter areas and column volumes.
3. Buffers/solutions to be used in the process.
4. Buffer addition requirements at each step for pH adjustments, conductivity adjustments, and inline dilution to a volumetric ratio.
5. Volume and concentration information of product to be processed through the system.

System Setup

The following steps are performed for physical setup of the purification system for operation. Preferably, the steps will be performed in the order provided, although certain deviations may be possible as required.

1. Connect flexible tubing buffer lines to buffer bags or tanks.
2. Insert buffer pump tubing assemblies into the buffer pumps and connect the low pressure tubing end to the buffer valve block outlet.
3. Install flow kits in the flow kit holders, located on system tray.
4. Install pump tubing in pump head directly above the flow kit.
5. Install flow kit assembly high pressure tubing in pinch valves. Each flow kit has two high pressure pinch valves (V1 and V2) and two low pressure pinch valves (V3 and V4) dedicated to it on the system tray. The braided tubing from hose barb connection P2 should be installed in the high pressure pinch valves. The tubing is installed directly below the Y connector. Install tubing for all stages in use (up to four per system).
6. Connect flow kit assembly tubing from the second high pressure pinch valve (V2) of each stage to the column or filter inlet. Connect tubing from product inlet hose barb P3 on the right side of the flow kit to the outlet of the column or filter.
7. Install the non-braided tubing from flow kit hose barb connection P4 in the low pressure pinch valves. Install the line to the flow kit vessel hose barb P5 in pinch valve V3. Insert the line to waste in pinch valve V4. The tubing is installed directly below the Y connector. Install tubing for all stages in use (up to four per system).
8. Connect buffer lines to the ½" sanitary clamp buffer inlets A1 and A2 located on the top of the flow kit. The four total buffer line connections can be made to any of the two buffer inlets on each of four flow kits (eight possible buffer connection points). Connections that are not used should remain capped. Location of connections is process specific (based on specific drug to be manufactured).
9. Connect product lines from each stage of the process to the next with the sterile quick connects. The product lines exit a flow kit through the vessel hose barb P6 and enter the next flow kit through hose barb P1. The product line entering the first flow kit will connect from the pre-skid vessel or other user designated vessel. The product line leaving the last flow kit in series will connect to the auxiliary (AUX) vessel or a separate collection vessel if needed (based on specific drug to be manufactured).
10. If a dual column step is to be performed, make the following connections.
11. Connect tubing from V1 of the first chromatography stage to a Y on the outlet of V2 of the second chromatography stage.
12. Connect tubing from V1 of the second chromatography stage to a Y on the outlet of V2 of the first chromatography stage.
13. For both chromatography stages (1 & 2) connect valve three outlets (V3) to the large auxiliary vessel, instead of the flow kit vessel inlet.
14. If the dual columns step is not the last unit operation in series, connect the outlet of the auxiliary vessel to the product inlet tubing of the subsequent downstream stage (in place of flow kit vessel outlet tubing).
15. Connect the flow kit assembly tubing from the first pinch valve (V1) of each stage not used for a chromatography step to the drain header.
16. Connect the flow kit assembly tubing from the fourth pinch valve (V4) of all stages to the drain header.
17. Connect the drain header to the appropriate waste container.
18. Enter process information in automation control screens.

System Initialization

System initialization steps prepare the process equipment for steady state operation. These steps include buffer priming, sanitization, equilibration, and vessel fill.

First, all buffer lines are primed to remove any air in the tubing. During buffer priming, flow is directed to drain through the first product valve (V1) of a stage for inlet buffer adjustments or the last product valve (V4) for outlet buffer adjustments.

After the buffer lines are primed, the lines are sanitized with the sanitization buffer. Sanitization buffer is first directed to waste through V1 or V4 (depending on inlet or outlet buffer adjustment). After a short time, the waste line (V1) is closed and flow is directed to the column or filter through V2 and to waste on the outlet side of the filter or column through V4. Sanitization buffer does not enter the flow kit vessel through V3. After the lines are filled with sanitization buffer the pump is stopped and a sanitization hold takes place.

Equilibration buffer is then flushed through V2, through the column/filter, and to waste through V4.

At this point the system enters steady state. Flow is directed to the flow kit vessels through the third product valve (V3) and the waste lines (V4) are closed. Product pumps turn on and the vessels sequentially fill to their target levels.

Steady State

During steady state, all stages of the system are operated at the same mass flow rate to achieve a synchronous process. A simple flow rate set point for all pumps is not sufficient due to inherent variability in the pumps that would cause intermediate break vessels between each step to drain or overflow. Synchronous operation is achieved with four control schemes: mass flow control, flow kit vessel level control, dual column vessel level control, and high-low level control. The mass flow control scheme controls the last product pump in the process to a flow rate set point. Flow kit vessel level control scheme continuously controls all upstream product and buffer pumps to ensure the vessel levels between each process stage remain constant. Thus, if one stage slows down, all other stages will slow down accordingly to maintain break vessel levels. The dual column vessel level control scheme periodically adjusts the product and buffer flow rates of the chromatography step to ensure the outlet vessel level of this stage remains within acceptable levels. Since the fill of this vessel is periodic rather than constant (when an elution step occurs), the dual column vessel level control and associated buffer and product pump flow rate adjustments occur only one time at the start of each load cycle.

Mass Flow Control

The last product pump within the process is controlled to a flow rate set point, which controls the overall mass flow rate of the entire process. The flow rate set point adjusts based on the error in the inlet flow rate of the most critical unit operation. For example, if the most critical unit operation has an inlet flow rate error of (−1 mL/min), the last product pump will increase in flow rate under PID control. This increase in flow rate will cause a cascade up the system as PID vessel level controllers (described below) compensate by increasing each upstream product pump flow rate.

Unit operation criticality in descending order is as follows: diafiltration, virus inactivation, inline concentration, dual column chromatography, and lastly, flow through.

The PID controller determines the controlling product pump flow rate (F) based on process flow rate error (e), integral error ($e_i$) and PID constants ($K_p$, $K_i$) for the most critical unit operation, as shown below:

$$F = K_p \times e + K_i \times e_i \times (t - t_{old}) + F_{sp}$$

Where, $$e = (\text{product pump flow} + \text{inlet buffer pump flow}) - (\text{product pump flow setpoint} + \text{inlet buffer pump flow setpoint})$$

$$e_i = e_{i_{old}} + e$$

If the last unit operation is Dual Column Chromatography, error is only calculated once at the beginning of each cycle immediately before load begins.

After the new flow rate is calculated, it is filtered to ensure it does not exceed the flow rate limitations around the unit operation.

Flow Kit Vessel Level Control

Product and buffer pump flow rates are controlled by a PID loop set to maintain a constant vessel level. Since product flow is constantly entering and leaving the vessels between each purification stage, the PID loop ensures all steps flow at the same rate. In addition, small intermediate break vessels used do not empty or overflow. The logic is as follows:

The product or buffer pump new flow rate (F) is calculated based on the vessel level error (e), integral error ($e_i$) terms and PID constants ($K_p$, $K_i$), as follows:

$$F = K_p \times e + K_i \times e_i \times (t - t_{old}) + F_{sp}$$

Where, $$e = L - L_{sp}$$

$$e_i = e_{i_{old}} + e$$

And,

L=current vessel level
$L_{sp}$=level set point

A filter limits the flow rate based on the minimum and maximum flow value around the unit operation, which is the sum of the product and buffer pump flow rates. An important note is that the filter does not simply limit the pump flow rate to a set minimum and maximum value around the pump. It limits it based on the minimum and maximum flow value around the unit operation, which is the sum of the product and buffer pump flow rates, which may be in constant flux.

Dual Column Vessel Level Control

The dual column product pump is controlled with a PID loop on the dual column vessel level. Because the dual column vessel is filled periodically, rather than with a steady flow of material, continuous PID control cannot be used. Instead, a standard PID controller will be implemented, but it will only calculate error terms and change pump flow rates once at the beginning of each chromatography cycle, immediately prior to the start of load.

High-Low Level Control

Vessel high-low level control stops the pumps from running in extreme circumstances. If tank levels reach the low limit, all downstream pumps turn off. If tank levels reach the high limit then all upstream pumps turn off. In addition to maintaining control throughout steady state operation, this logic assists with a smooth start up at the beginning of steady state when vessels are initially empty.

DETAILED DESCRIPTION OF THE FIGURES

FIG. 1 is a line drawing evidencing an example of the steps of a single pass diafiltration process, as known in the prior art.

Figure 2:
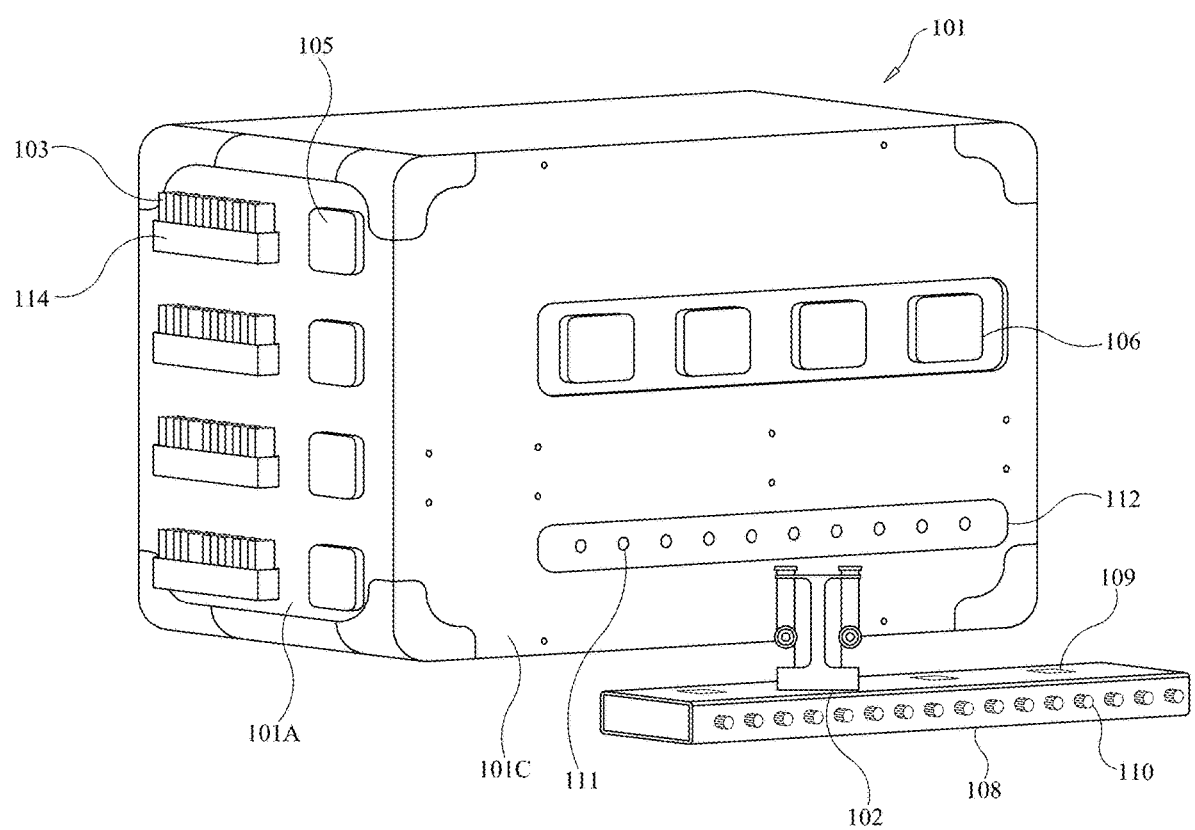
FIG. 2 is a line drawing evidencing a housing of a continuous purification system, showing pumps and valves.

FIG. 2 is a line drawing evidencing a housing 101 of a continuous purification system 100, as well as an associated tray 108. On the inlet side 101A of the housing are located a plurality of buffer valve blocks 103. Each buffer valve block is adjacent to an associated buffer pump 105, which pumps to one of eight buffer connections on four flow kits (two possible locations per flow kit).

On the front side of the housing are arranged a plurality of product pumps 106, again one per purification stage. Located below the product pumps is a jack strip 112 comprising a plurality of electrical connections 111 for attaching cables to the control unit 130 (internal), with which a user will establish instrument connections for each purification stage.

A tray 108 is positioned in front of the housing. The tray holds four scales 109, wherein a flow kit 102 is mounted on each scale. The tray also holds sixteen pinch valves 110, such that one scale with one flow kit and four pinch valves together service each purification stage. The four pinch valves for a unit operation direct flow (1) from flow kit to waste, (2) from flow kit to filter/column inlet, (3) from filter column to flow kit collection vessel, and (4) from filter/column to waste.

Figure 3:
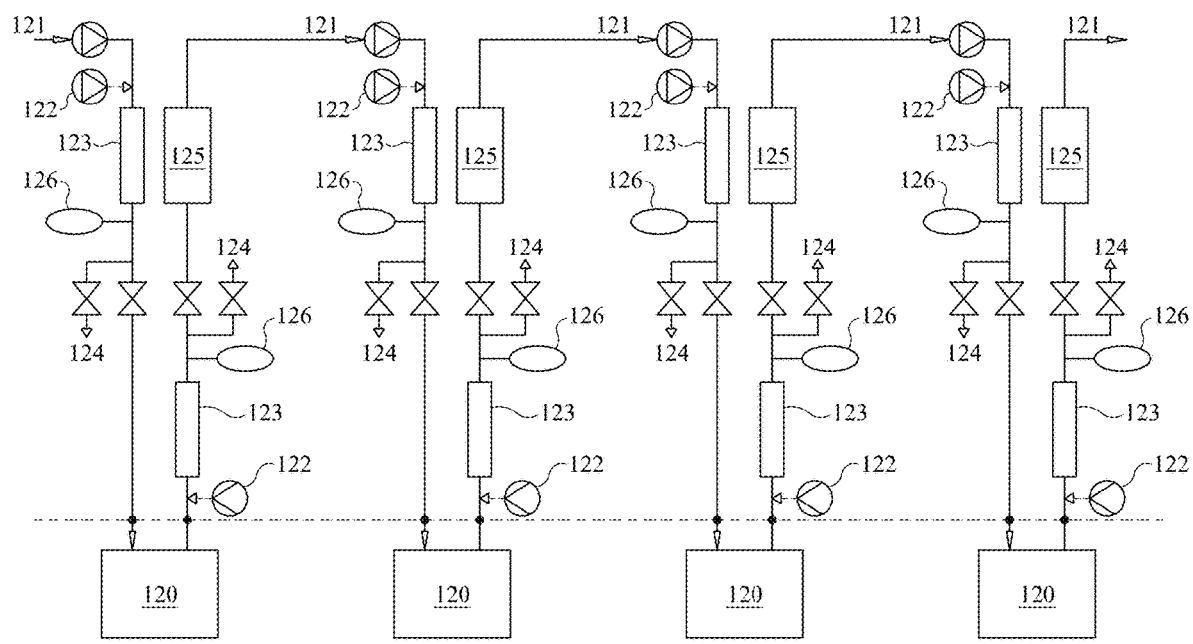
FIG. 3 is a schematic diagram evidencing fluid flow through each of the four stage columns of the continuous purification system of FIG. 2.

FIG. 3 is a schematic drawing evidencing fluid flow through each of the four stages of the continuous purification system of FIG. 2. Each of the four purification stages 120 is indicated. Each reference to a "line" herein also comprises a fluid pump capable of moving fluid and maintain a preset pressure. A product line 121 is shown moving the product fluid through all four purification stages, with a buffer line 122 optionally inputting buffer solution according to preset instructions. Immediately following such addition of buffer solution, the product with buffer is shown to enter a static mixer 123. Following static mixing, the product passes through at least one instrument 126, embodied as a sensor depending on need for a given purification process, but taken from a group including pH, conductivity, pressure, or, at the inlet to a break vessel only, UV, such instrument(s) connected by wire to the control system 130 (not pictured). Next, the product line is directed either to the waste line 124 or into the filter or column of the purification stage 120. Upon exit of the filter or column, wherein another buffer line 122 adds the next required buffer solution(s) as required, followed by another static mixer 123 step, another measurement by instrument 126 and potential adjustment by the control system, followed by another optional dump to waste line 124 for equilibration or sanitation as needed. In the event that the newly buffered product bypasses such waste dump, it then travels to a vented break vessel 125 for additional mixing of the buffer solution(s) and product. After mixing in the break vessel, the mixed product is then pumped through the product line 121 to the next stage of the purification process, repeating all aforementioned steps as indicated in the figure.

In the system as detailed, instruments 126 periodically signal measurements either electrically or wirelessly to the control system 130. The control system responds to signals indicating a reading requiring adjustment by adjusting speeds of the appropriate buffer pump and/or product pump. This allows the flow at the appropriate flow kit to be brought back within the preset range of acceptability for the measured characteristic.

Figure 4:
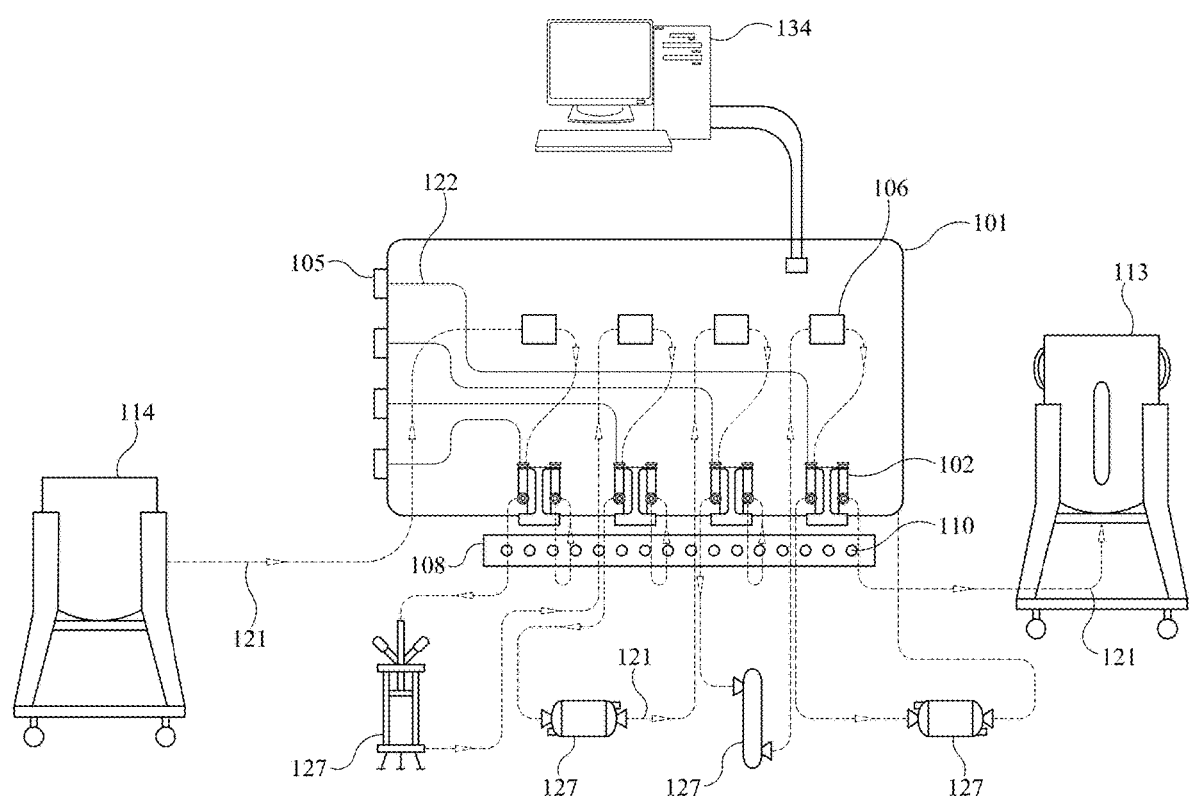
FIG. 4 is a line drawing evidencing product and buffer line flow through the disclosed system of FIG. 2.

FIG. 4 is a line drawing indicates the pathway of both product and buffer fluids throughout the purification system, as detailed schematically in FIG. 3. The view is from the front side of the housing 101, with all buffer pumps 105 visible on the left, product pumps 106 visible on the front and an electronic connection to the user interface 133 on the right side for programming the control system prior to initiation.

The tray 108 is arranged next to the front side of the housing, with four flow kits 102 on top of the tray and sixteen pinch valves 110 arrayed across the front of the tray, four pinch valves to each flow kit. A buffer line 122 is shown connecting each buffer pump to one respective flow kit for the introduction of an appropriate buffer solution for each chromatography column or filter 127. Product line 121 begins at raw product vessel 114, proceeds to a first product pump 106, and then proceeds respectively through flow kits 102, pinch valves 110 and further product pumps 106, with fully purified product finally exiting the last flow kit and proceeding to the containment vessel 113. For the purposes of this disclosure, a unit operation chromatography or filtration step embodied as a chromatography column or filter.

Figure 5:
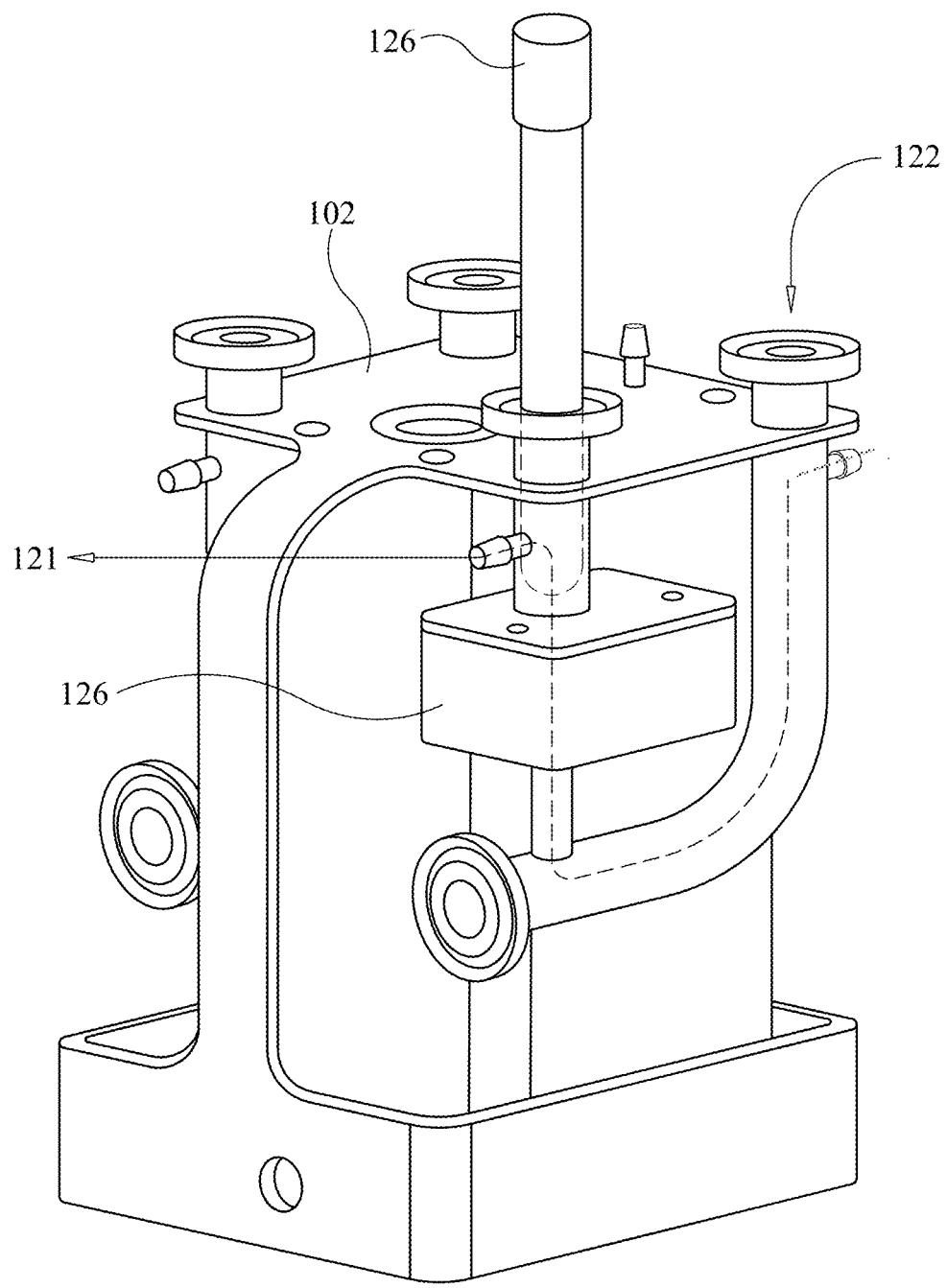
FIG. 5 is a line drawing evidencing an exemplary flow kit of the disclosed system of FIG. 2.

FIG. 5 shows an exemplary flow kit 102, evidencing the product line 121, buffer line 122, and instruments 126. In this iteration, the instruments could be a pH sensor, conductivity sensor, pressure sensor, and/or UV meter.

PARTS OF THE INVENTION

100 Purification system
101 Housing
101A Inlet side
101B Outlet side
101C Front side
101D Back side
102 Flow kit
103 Buffer valve block
104 Buffer inlet
105 Buffer pump
106 Product pump
107 Electrical connection
108 Tray
109 Scale
110 Pinch valve
111 Wire jacks
112 Jack strip
113 Collection vessel
114 Raw product container
120 Stage column
121 Product line
122 Buffer line
123 Static mixer
124 Waste line
125 Break vessel
126 Instruments
127 Chromatography column (or filter)
130 Control system
131 PLC
132 Memory
133 PID controller
134 User interface

We claim:

1. A protein purification system comprising:
   (A) a housing containing a control system running a first control loop regulating a mass flow through a series of two to four purification stages,
   (B) a collection vessel, and
   (C) the two to four purification stages connected by a protein product line and operated in series simultaneously,
   wherein each purification stage comprises
      (1) a product pump and protein product line,
      (2) a buffer pump and a buffer line,
      (3) a flow kit,
      (4) an apparatus configured to perform a protein purification method selected from the group consisting of: virus inactivation, flow through filtration, flow through chromatography, dual column chromatography, inline concentration, and diafiltration,
      (5) two or more valves,
      (6) a sensor configured to measure flow, and
      (7) a waste line;
   wherein a flow rate of each purification stage is controlled by a second control loop comprising a proportional-integral-derivative (PID) controller in communication with the product pump, the buffer pump, and the sensor,
   wherein the second control loop adjusts flow rates of the product and buffer pumps to match the mass flow set by the first control loop;
   wherein the mass flow set by the first control loop is adjusted based on an error in the flow rate of a most critical unit operation,
   wherein criticality in descending order is as follows: (a) the virus inactivation, (b) the dual column chromatography, and lastly (c) the flow through filtration or the flow through chromatography;
   whereby the system is capable of continuous protein purification.

2. The protein purification system of claim 1, comprising a tray comprising at least two scales, each scale accommodating the flow kit of each of the two to four purification stages, and wherein the tray further comprises a front side comprising the valves of each stage, the valves opened and closed by the control system to direct flow either to a waste line or down the protein product line to the next of the purification stages or the collection vessel.

3. The protein purification system of claim 1, wherein the housing comprises the buffer pumps, at least one buffer valve for each buffer pump, the product pumps, and a plurality of electrical instrument connections for connecting the control system to each stage.

4. The protein purification system of claim 1, wherein the control system further comprises one or more of each of a central processing unit, memory and transmitters, wherein the control system is connected electrically or wirelessly to a user interface, one or more sensors, one or more pumps, and one or more valves.

5. The protein purification system of claim 1, wherein the second control loop sets the flow rate through the buffer pumps to achieve inline dilution based on pH, conductivity and/or a volumetric ratio at up to eight possible locations that include the flow inlet and flow outlet of each of the two to four purification stages.

6. The protein purification system of claim 1, wherein each flow kit is connected to each of the protein product line, buffer line and waste line with flexible tubing and hose-barb connections.

7. The protein purification system of claim 1, wherein each flow kit comprises one or more instruments from the group consisting of: a pH sensor, conductivity sensor, flow sensor, UV sensor, and pressure sensor, wherein reading of each instrument are communicated electronically to the control system.

8. The protein purification system of claim 1, wherein the protein product line is configured to provide a raw product from a raw protein product vessel, to a first product pump of the product pumps, and thereafter through all of the flow kits and product pumps to a collection vessel.

9. The protein purification system of claim 1, wherein any sequence of purification methods can be selected by inputting directions on a user interface.

10. The protein purification system of claim 1, where the system comprises three to four purification stages.

11. The protein purification system of claim 1, wherein the system comprises four purification stages.

12. The protein purification system of claim 1, wherein the second control loop for each purification stage is in further communication with at least one pinch valve of the purification stage.

13. The protein purification system of claim 1, wherein a last stage in the series of two to four stages is actively controlled by the first control loop to a flow rate setpoint, which controls an overall mass flow through the system.

14. The protein purification system of claim 1, wherein criticality in descending order is as follows: (a) the diafiltration, (b) the virus inactivation, (c) the inline concentration, (d) the dual column chromatography, and lastly, (e) the flow through filtration or the flow through chromatography.

15. The protein purification system of claim 1, wherein the flow rate of each purification stage is determined by summing the flow rates of the product and buffer pumps.

16. The protein purification system of claim 12, wherein a user defines a minimum and maximum flow rate value for a target flow rate prior to system operation.

17. The protein purification system of claim 1, wherein the flow kit further comprises a static mixer, wherein the product pump, the protein product line, the buffer pump and the buffer line are fluidly connected to an inlet of the static mixer and the apparatus configured to perform a protein purification method is fluidly connected to the outlet of the static mixer.

18. The protein purification system of claim 2, wherein the sensor configured to measure flow is each scale.

* * * * *